March 8, 1938. J. B. TAFFE 2,110,583
WHEEL SUSPENSION
Filed April 1, 1937
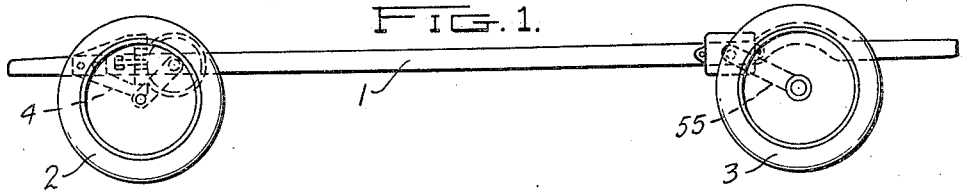
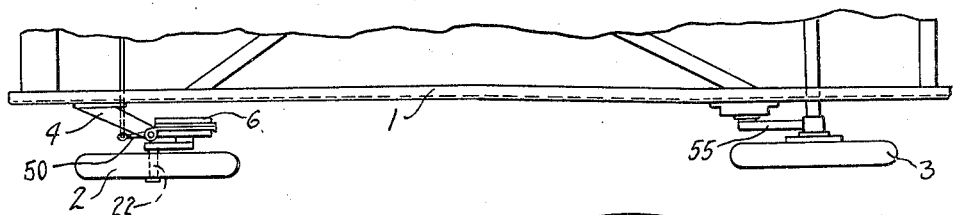
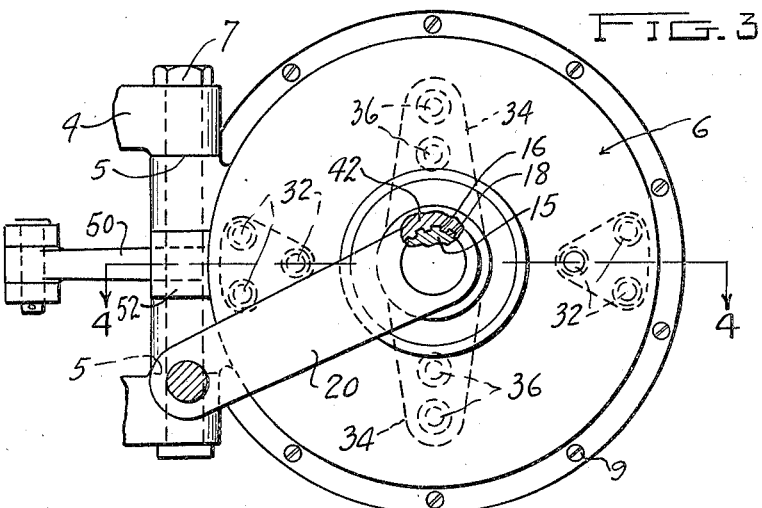
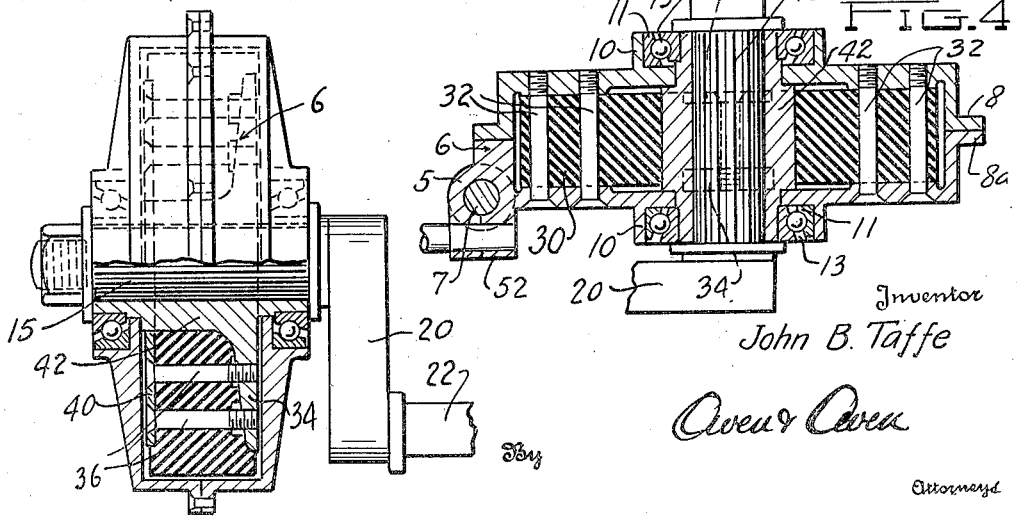
Inventor
John B. Taffe
By Owen & Owen
Attorneys Patented Mar. 8, 1938

2,110,583

UNITED STATES PATENT OFFICE 2,110,583

WHEEL SUSPENSION

John B. Taffe, Detroit, Mich.

Application April 1, 1937, Serial No. 134,360

2 Claims. (Cl. 267—21)

This invention relates to wheel suspensions for automotive vehicles, and is particularly directed to a device for mounting each wheel independently and resiliently with respect to the frame of the vehicle.

The primary object of the invention is the provision of a self-contained resilient wheel mounting which is simplified in its construction and which requires no attention from the car owner.

Another object of the invention is the provision of a device of this character which may be readily manufactured and installed and which may be easily disassembled for inspection.

Other objects and advantages of the invention will become apparent as the description proceeds, reference being had to the accompanying drawing, in which—

Figure 1 is a diagrammatic side elevation of a car frame having wheels mounted thereon by means of devices constructed in accordance with the present invention; Fig. 2 is a fragmentary top plan view of the vehicle shown in Fig. 1; Fig. 3 is a side elevation of a suspension unit suitable for use with the front or turnable wheels of a vehicle; Fig. 4 is a section on line 4—4 of Fig. 3, and Fig. 5 is an end view, with parts in section, of the device shown in Fig. 3.

Referring to the drawing, 1 designates a car frame supported by front wheels 2 and rear wheels 3 through the medium of devices constructed in accordance with the present invention.

In the case of the front or turnable wheels of the vehicle, a bifurcated bracket 4 may be provided extending from the frame 1 and receiving hinge lugs 5 between the ends of its furcations. The lugs 5 project from a housing 6 and are hingedly connected to the parts 4 by a pintle 7 extending through the furcations of the bracket and the lugs. The housing 6 is a cylindrical body formed in two parts and having edge flanges 8 and 8ª through which fastening elements 9 may extend to hold the halves of the housing together.

Each half of the housing is provided with a central hub 10 which receives a stationary ball race 11 of an anti-friction bearing 13. A stub axle 15 is projected through and is splined to a sleeve member 42 by means of a series of mating teeth 16 and 18. The shaft 42 is received between the sides of the housing and has end portions projecting out through central openings in the respective housing members and carrying movable ball races to cooperate with the antifriction bearings 13. At one end the stub axle 15 is held in place by a nut and washer assembly 17, and at its opposite end is connected to an actuating arm 20, which carries a wheel spindle 22 at its free end on which the front wheel of a vehicle may be fastened in any suitable manner.

A body of rubber or similar resilient substance 30 is disposed within the housing 6 and is fixed thereto at diametrically opposed points by sets of bolts 32 extending through the housing from one side to the other. The mass of rubber 30 is also fixed to arms 34 extending at diametrically opposite points from the sleeve 42 and preferably formed integral therewith. Bolts 36 may be used to fix the mass of rubber to the arms 34 and the heads of the bolts may engage a backing plate 40 carried opposite to the arms 34. It will thus be seen that the rubber body is fixed to the movable shaft by the arms 34 and to the housing by the bolts 32, so that an angular displacement or rotation of the shaft will cause the rubber body to be stressed between the sets of bolts 36 and 32.

In operation, as the arms 34 tend to rotate in response to an angular displacement of the arm 20 caused by a vertical movement of the wheel to which the spindle 22 is connected, the sectors of the mass of rubber within the housing will be placed under compression and tension, respectively, as the movable arms 34 tend to move a sector of rubber toward the stationary fastening elements or bolts 32. It will be appreciated that as one-half of the rubber is placed under compression, the other half will be placed under a corresponding tension. These forces will return the wheel to its normal position as soon as the unevenness in the road, which caused the vertical displacement of the wheel, is passed. It will be seen that the present invention provides a distinct advantage over a spring used in a similar connection, since the mass of rubber has a definite tendency to dampen rebounding forces so that continued oscillation of the mass is quickly terminated.

If it is found that in a particular installation the position of the arm 20 is not proper for the load which the vehicle must carry, this condition can be corrected by changing the relative initial setting of the stub axle 15 and the shaft 42. It is for this reason that the continuous series of spline teeth 16 and 18 are provided between these two members.

A suitable steering link 50 engages a boss 52 carried by the hinge lugs 5 so that the wheels may be turned about the pintle 7 to steer the vehicle. Obviously, any suitable mechanism may be used since this forms no part of the present invention.

In the case of the rear wheels, it is not necessary to provide any means to move the housing relative to the frame so that the latter may be bolted directly in place. In this instance, the housing is shown as rectangular in form, but the principle of operation is identical to that outlined above, since the rubber body will be fixed to the halves of the housing by bolts and to a movable shaft actuated by an arm 55 on which the rear wheel may be carried.

While the invention has been disclosed in connection with a particular form and disposition of the parts, it will readily be appreciated that various modifications and changes may be made without departing from the spirit of the invention as defined in the appended claims.

Having thus described my invention, what I claim as new, and desire to secure by United States Letters Patent, is:

1. A wheel suspension for a vehicle having a frame including, a housing fixed against vertical displacement relative to the frame, an actuating arm having a wheel carrying part at one end and connected at its other end to a shaft received in said housing, said shaft consisting of two concentric parts splined together, and a mass of resilient material fixed to said housing at spaced points, arms carried by the outer of said concentric shaft parts, and means to fix said arms to said mass of resilient material whereby rotation of said shaft is resisted by said mass of resilient material.

2. A wheel suspension for a vehicle having a frame including, a housing fixed against vertical displacement relative to the frame, an actuating arm having one end connected to a wheel of a vehicle, a shaft journaled in said housing and provided with an internal series of spline surfaces, a stub axle fixed to said actuating arm and having a series of external splined surfaces adapted to coact with the surfaces of said shaft to transmit movement from the arm to the shaft, and a mass of rubber fixed at spaced points to said housing and at intermediate points to said shaft whereby rotation of the shaft in the housing is resisted.

JOHN B. TAFFE.